(12) United States Patent
Shimizu et al.

(10) Patent No.: US 8,079,257 B2
(45) Date of Patent: Dec. 20, 2011

(54) METHOD AND APPARATUS FOR BALANCING AN ELECTRICALLY ASSISTED TURBOCHARGER ROTOR

(75) Inventors: Masahiro Shimizu, Tokyo (JP); Takehiko Ishizawa, Tokyo (JP)

(73) Assignee: IHI Corporation, Tokyo (JP)

(*) Notice: Subject to any disclaimer, the term of this patent is extended or adjusted under 35 U.S.C. 154(b) by 761 days.

(21) Appl. No.: 12/093,875

(22) PCT Filed: Dec. 11, 2006

(86) PCT No.: PCT/JP2006/325127
§ 371 (c)(1),
(2), (4) Date: May 15, 2008

(87) PCT Pub. No.: WO2007/080744
PCT Pub. Date: Jul. 19, 2007

(65) Prior Publication Data
US 2009/0183556 A1    Jul. 23, 2009

(30) Foreign Application Priority Data
Jan. 10, 2006  (JP) ................. 2006/002307

(51) Int. Cl.
*G01M 1/06* (2006.01)
(52) U.S. Cl. ........................................ 73/455
(58) Field of Classification Search .......... 73/455, 73/462, 475
See application file for complete search history.

(56) References Cited

U.S. PATENT DOCUMENTS
4,170,528 A * 10/1979 Mathews ............. 205/644
4,573,355 A *  3/1986 Reutlinger ........... 73/455

FOREIGN PATENT DOCUMENTS
| EP | 0 699 900 A2 | 3/1996 |
| JP | 1-200002 | 8/1989 |
| JP | 2002-039904 | 2/2002 |
| JP | 2003-293785 | 10/2003 |
| JP | 2004-116317 | 4/2004 |

OTHER PUBLICATIONS

International Search report with Written Opinion of the International Searching Authority in corresponding application No. PCT/JP2006/325127, completed Mar. 6, 2007 and mailed Mar. 22, 2007.

* cited by examiner

*Primary Examiner* — John Chapman, Jr.
(74) *Attorney, Agent, or Firm* — Griffin & Szipl, P.C.

(57) ABSTRACT

A rotation is corrected by rotationally driving a supercharger rotor (a turbine impeller (2), a compressor impeller (6) and a shaft (12)) by an electric motor (18) in a state of detaching a turbine housing (4) and a compressor housing (8), and detecting data necessary for correcting the rotation inbalance of a motor-driven supercharger (10). Further, the electric motor (18) is driven by using a dedicated motor driver (27) supplying a larger electric power than a power supply of an acceleration assisting motor driver.

5 Claims, 3 Drawing Sheets

US 8,079,257 B2

METHOD AND APPARATUS FOR BALANCING AN ELECTRICALLY ASSISTED TURBOCHARGER ROTOR

This is a National Phase Application in the United States of International Patent Application No. PCT/JP2006/325127 filed Dec. 11, 2006, which claims priority on Japanese Patent Application No. 002307/2006, filed Jan. 10, 2006. The entire disclosures of the above patent applications are hereby incorporated by reference.

BACKGROUND OF THE INVENTION

1. Technical Field of the Invention

The present invention relates to a rotation balance correcting method of a motor-driven supercharger provided with an electric motor assisting a rotational drive of a supercharger rotor, and a rotation balance testing apparatus thereof.

2. Description of the Related Art

In order to improve a performance of an internal combustion engine, there has been widely used a supercharger (also called as "turbocharger") driven by an exhaust gas of the internal combustion engine so as to compress an intake air and supercharge. Further, there has been known a supercharger in which an acceleration response or the like is improved by incorporating an electric motor on the same axis as a shaft of a supercharger, and accelerating and assisting a rotational drive of a compressor. The supercharger having a motor-driven assist function by the electric motor is called a "motor-driven supercharger."

FIG. 4 is a cross sectional view showing a structure of a general motor-driven supercharger 10.

A compressor impeller 6 and a compressor housing 8 surrounding it are arranged in an air supply passage side of the motor-driven supercharger 10.

A turbine impeller 2 and a turbine housing 4 surrounding it are arranged in an exhaust passage side of the motor-driven supercharger 10.

The turbine impeller 2 is integrated with a shaft 12 by welding or the like, and the shaft 12 is fitted to a center portion of the compressor impeller 6. The compressor impeller 6 is fastened by a nut 7.

The shaft 12 is rotatably supported by a journal bearing 16 and a thrust bearing 17 built in a center housing 14.

On the basis of this structure, the turbine impeller 2, the compressor impeller 6 and the shaft 12 are integrally rotated. Hereinafter, a rotating body constituted by the turbine impeller 2, the compressor impeller 6 and the shaft 12 is called as "supercharger rotor".

Further, the center housing 14 has an electric motor 18 having a rotor 18A coaxially coupled to the shaft 12, and a stator 18B arranged around the rotor 18A built-in.

In the motor-driven supercharger 10 structured as mentioned above, the turbine impeller 2 is rotated by an exhaust gas from the internal combustion engine (the engine), the compressor impeller 6 coupled thereto is rotationally driven and the rotational driving is assisted by the electric motor 18, and an intake air is supercharged so as to be supplied to the internal combustion engine.

On the other hand, in the motor-driven supercharger 10, a rotation balance test is executed for every product before shipping the product so as to measure an unbalance amount, and a rotation balance correction is executed. Particularly, in the motor-driven supercharger 10, the shaft 12 becomes longer at a degree that the electric motor 18 is attached, in comparison with the supercharger in which the electric motor is not mounted, and a high-level balance correction is required.

The conventional rotation balance correcting method of the supercharger is disclosed, for example, in the following patent document 1. FIG. 1 is a view explaining the rotation balance correcting method in the patent document 1, and this method is constituted by the following steps (A) to (E).

(A) Attaching a turbine housing 51 of the supercharger 50 in a state of detaching only a compressor housing to a turbine housing mounting plate 53 of a vibration table 52.

(B) Attaching an accelerator pickup 54 to a flat surface 53a of the turbine housing mounting plate 53.

(C) Arranging a rotation detector 55 near a compressor impeller 56.

(D) Supplying a compressed air to a turbine impeller 57 and rotating the turbine impeller 57 at a high speed.

(E) If reaching a predetermined high-speed rotating speed, detecting an acceleration (a vibration) of the supercharger 50 by the accelerator pickup 54, detecting an angle of rotation of the compressor wheel 56 by the rotation detector 55, and correcting a high-speed unbalance amount of the supercharger rotor on the basis of a result of computation of the detected input signals in a computing element 58.

Further, the following patent document 2 discloses striking a rotation balance as an entire supercharger rotor while detecting a vibration by a vibration pickup provided in a supercharger housing, by driving a turbine rotor (a turbine impeller) by a compressed air having a high temperature equal to or more than 400° C.

Patent Document 1: Japanese Unexamined Patent Publication No. 2002-39904
Patent Document 2: Japanese Unexamined Patent Publication No. 2004-116317

In the prior arts disclosed in the patent documents 1 and 2 mentioned above, the rotation balance correction is executed by driving the turbine impeller by the compressed air, rotating the supercharger rotor at a high speed, and detecting the data necessary for correcting the rotation balance. As mentioned above, since a compressed air source is necessary for rotating the supercharger rotor at a high speed, a rotation balance testing apparatus is enlarged in size.

Furthermore, the supercharger is generally designed so that a pressure balance in an inner portion of the supercharger is correctly adjusted; however, in the case that the supercharger is mounted on the engine, in accordance with the prior art disclosures mentioned above, because the rotation balance test is executed in the state in which only the compressor housing is detached, the normal pressure balance is not secured. In other words, explaining with reference to FIG. 4, if only the compressor housing 8 is detached, and the compressed air is supplied to the turbine impeller 2, a force in a left direction in FIG. 4 is applied to the turbine impeller 2 on the basis of the pressure balance in a periphery thereof. Accordingly, an excessive axial load (a counterthrust force) in the turbine side is applied to the thrust bearing 17 via the shaft 12, and the thrust bearing 17 is adversely affected.

Further, since the turbine impeller 2 is covered by the turbine housing 4, it is necessary to detach the turbine housing 4 and a piping connected thereto in the case that the balance correction is necessary in the turbine impeller 2 side, so that the balance correcting work is complicated.

SUMMARY OF THE INVENTION

The present invention is made by taking the circumstances mentioned above into consideration, and an object of the present invention is to provide a rotation balance correcting method of a motor-driven supercharger which can make a rotation balance testing apparatus simple and compact, and can easily execute a balancing in a turbine impeller side without an excessive counterthrust force applied to a thrust bearing, and a rotation balance testing apparatus.

In order to solve the object mentioned above, the rotation balance correcting method of the motor-driven supercharger in accordance with the present invention employs the following means.

In other words, in accordance with the present invention, there is provided a rotation balance correcting method of a motor-driven supercharger structured such as to accelerate and assist a rotation of a supercharger rotor in which a turbine impeller and a compressor impeller are coupled to both ends of a shaft and are integrally rotated, by a built-in electric motor, comprising the steps of:

rotationally driving the supercharger by the electric motor;
detecting data necessary for correcting the rotation balance of the motor-driven supercharger; and
correcting the rotation balance.

According to the present invention mentioned above, since the rotation balance is corrected by using the electric motor built in the motor-driven supercharger, rotationally driving the supercharger rotor, and detecting the data necessary for correcting the rotation balance of the motor-driven supercharger, it is not necessary to supply the compressed air for rotating the supercharger rotor at a high speed to the turbine impeller.

Accordingly, the compressed air source is not necessary, and it is possible to make the rotation balance testing apparatus simple and compact.

Further, in the rotation balance correcting method of the motor-driven supercharger in accordance with the present invention, the electric motor is driven by using a dedicated motor driver which is different from an acceleration assisting motor driver supplying an electric power to the electric motor at a time of assisting the acceleration and supplies a larger electric power than a power supply of the acceleration assisting motor driver to the electric motor.

In the motor-driven supercharger corresponding to a finished product (a final product), the electric motor is driven by a motor driver for supplying an electric power to the electric motor at a time of assisting the acceleration, the acceleration assisting motor driver mentioned above is generally designed such as to supply an electric power by which a sufficient output for assisting the acceleration can be obtained to the electric motor. Accordingly, in the acceleration assisting motor driver, there is a case that it is hard to increase a rotating speed of the electric motor to a high-speed rotation required for a rotation balance test.

In accordance with the method of the present invention, since the electric motor is driven by using the dedicated motor driver which is different from the acceleration assisting motor driver and supplies the larger electric power than the power supply of the acceleration assisting motor driver, it is possible to increase the rotating speed of the electric motor to the high-speed rotation required for the rotation balance test.

Further, it is possible to correct an electromagnetic unbalance by measuring an unbalance amount at a time of driving the electric motor, and it is possible to reduce a noise caused by a vibration of a rotating body.

Further, in the rotation balance correcting method of the motor-driven supercharger in accordance with the present invention, the supercharger rotor is rotationally driven by the electric motor in a state of detaching the turbine housing and the compressor housing.

As mentioned above, in accordance with the method of the present invention, since the supercharger rotor is rotationally driven by the electric motor, it is not necessary to supply the compressed air to the turbine impeller at a time of the rotation balance test. Accordingly, it is possible to execute the rotation balance test in a state of detaching not only the compressor housing, but also the turbine housing.

Thus, the pressure balance in the inner portion of the supercharger, in accordance with the present invention, does not come down, which is different from the conventional method, and an excessive thrust force or a counterthrust force is not applied to the thrust bearing.

Further, in the conventional method, it is necessary to detach the turbine housing and the piping connected thereto in the case that it is necessary to adjust the balance in the turbine impeller side, however, in accordance with the method of the present invention, since such a work is not necessary, it is possible to rapidly execute the balance correcting work, and it is possible to widely shorten the correcting work time.

Further, in the rotation balance correcting method of the motor-driven supercharger in accordance with the present invention, the motor-driven supercharger is installed within a depressurizing chamber in which an inner portion is depressurized, and the supercharger rotor is rotationally driven.

As mentioned above, since the motor-driven supercharger is installed within the depressurizing chamber, and the supercharger rotor is rotationally driven, it is possible to reduce an air resistance applied to the turbine impeller and the compressor impeller at a time of rotating them. Accordingly, it is possible to securely increase the rotating speed of the electric motor to the high-speed rotation required for the rotation balance test.

Further, in order to solve the problem mentioned above, the rotation balance testing apparatus of the motor-driven supercharger in accordance with the present invention employs the following means.

In other words, in accordance with the present invention, there is provided a rotation balance testing apparatus of a motor-driven supercharger, the rotation balance testing apparatus applying a test for correcting a rotation balance to the motor-driven supercharger structured such as to accelerate and assist a rotation of a supercharger rotor in which a turbine impeller and a compressor impeller are coupled to both ends of a shaft and are integrally rotated, by a built-in electric motor, comprising:

a supercharger installation table capable of installing and fixing a center housing rotatably supporting a shaft of the motor-driven supercharger;

a dedicated motor driver which is different from an acceleration assisting motor driver supplying an electric power to the electric motor at a time of assisting an acceleration and supplies a larger electric power than an electric power of the acceleration assisting motor driver to the electric motor; and a data detecting device for detecting data necessary for correcting the rotation balance of the motor-driven supercharger.

Further, in the rotation balance testing apparatus of the motor-driven supercharger in accordance with the present invention, the rotation balance testing apparatus is further provided with a depressurizing chamber capable of accommodating the motor-driven supercharger and capable or decompressing an inner portion.

In accordance with the rotation balance testing apparatus of the motor-driven supercharger mentioned above, it is possible to execute the rotation balance correcting method of the motor-driven supercharger in accordance with the present invention mentioned above.

In accordance with the present invention, there can be obtained an excellent effect that it is possible to make the rotation balance testing apparatus simple and compact, and it is possible to easily execute the balance correction in the turbine impeller side without the excessive counterthrust force applied to the thrust bearing.

Thus, in accordance with a first non-limiting, illustrative embodiment of the present invention, a rotation balance correcting method is provided, of a motor-driven supercharger structured such as to accelerate and assist a rotation of a supercharger rotor in which a turbine impeller and a compressor impeller are coupled to both ends of a shaft and are integrally rotated, by a built-in electric motor, wherein the method includes the steps of: (a) rotationally driving the supercharger by the electric motor; (b) detecting data necessary for correcting the rotation balance of the motor-driven supercharger; and (c) correcting the rotation balance. In accordance with a second embodiment of the present invention, the first embodiment is modified so that the electric motor is driven by using a dedicated motor driver, which is different from an acceleration assisting motor driver supplying an electric power to the electric motor at a time of assisting the acceleration, and supplies a larger electric power than a power supply of the acceleration assisting motor driver to the electric motor.

In accordance with a third embodiment of the present invention, the first embodiment and the second embodiment are further modified so that the supercharger rotor is rotationally driven by the electric motor in a state of detaching the turbine housing and the compressor housing. In accordance with a fourth embodiment of the present invention, the third embodiment is further modified so that the motor-driven supercharger is installed within a depressurizing chamber in which an inner portion is depressurized, and the supercharger rotor is rotationally driven.

In accordance with a fifth embodiment of the present invention, a rotation balance testing apparatus of a motor-driven supercharger is provided, wherein the rotation balance testing apparatus applies a test for correcting a rotation balance to the motor-driven supercharger structured such as to accelerate and assist a rotation of a supercharger rotor in which a turbine impeller and a compressor impeller are coupled to both ends of a shaft and are integrally rotated, by a built-in electric motor, wherein the rotation balance testing apparatus includes: (a) a supercharger installation table capable of installing and fixing a center housing rotatably supporting a shaft of the motor-driven supercharger; (b) a dedicated motor driver that is different from an acceleration assisting motor driver supplying an electric power to the electric motor at a time of assisting an acceleration and supplies a larger electric power than an electric power of the acceleration assisting motor driver to the electric motor; and (c) a data detecting device for detecting data necessary for correcting the rotation balance of the motor-driven supercharger. In accordance with a sixth embodiment of the present invention, the fifth embodiment is modified so that the rotation balance testing apparatus is further provided with a depressurizing chamber capable of accommodating the motor-driven supercharger and capable of decompressing an inner portion.

The other objects and advantages of the present invention will be apparent from the following description with reference to the accompanying drawings.

DESCRIPTION OF THE PREFERRED EMBODIMENTS

Figure 1:
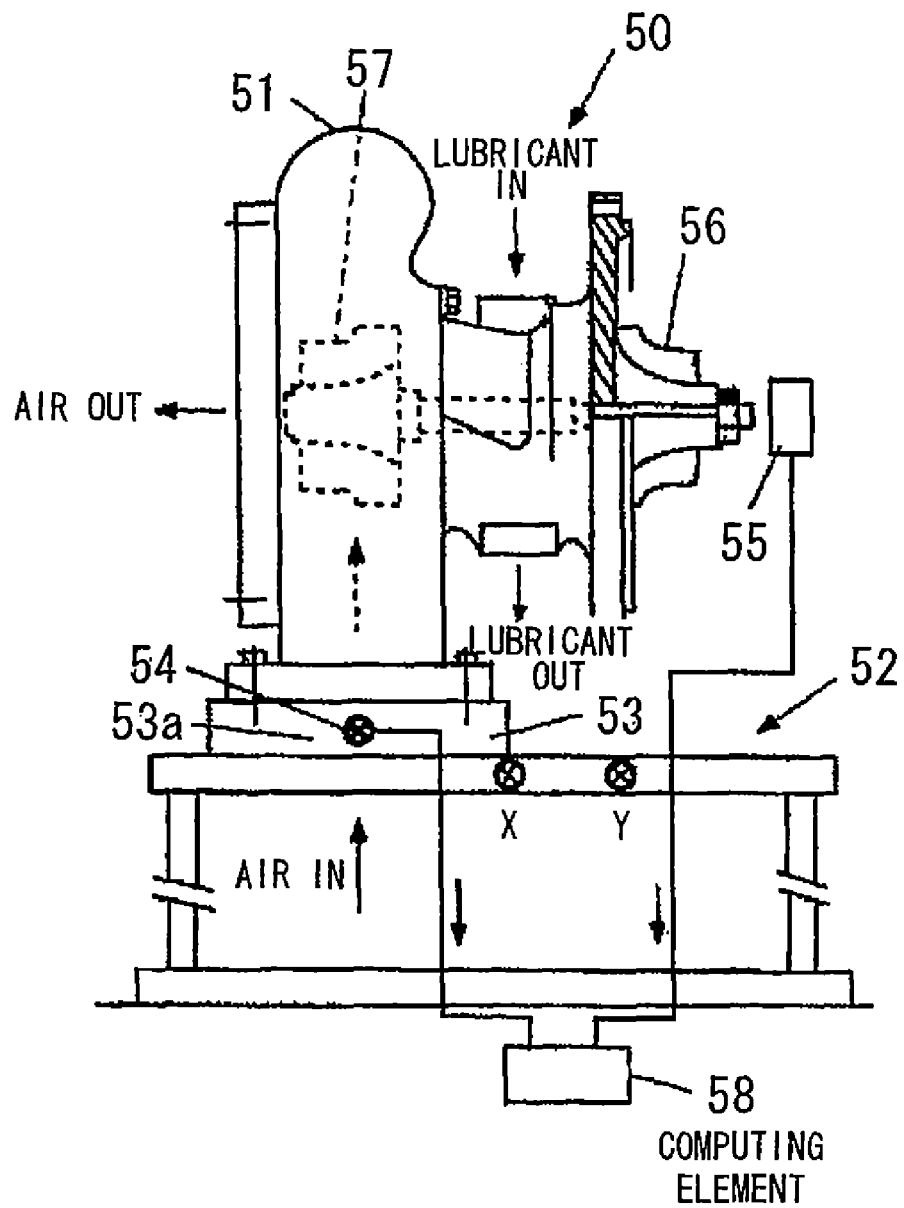
FIG. 1 is a view explaining a rotation balance correcting method of a motor-driven supercharger in accordance with a prior art.

A description will be in detail given below of preferable embodiments in accordance with the present invention on the basis of the accompanying drawings. In this case, the same reference numerals are attached to common portions in the drawings, and an overlapping description will be omitted.

First Embodiment

A description will be given below of a first embodiment in accordance with the present invention.

Figure 2:
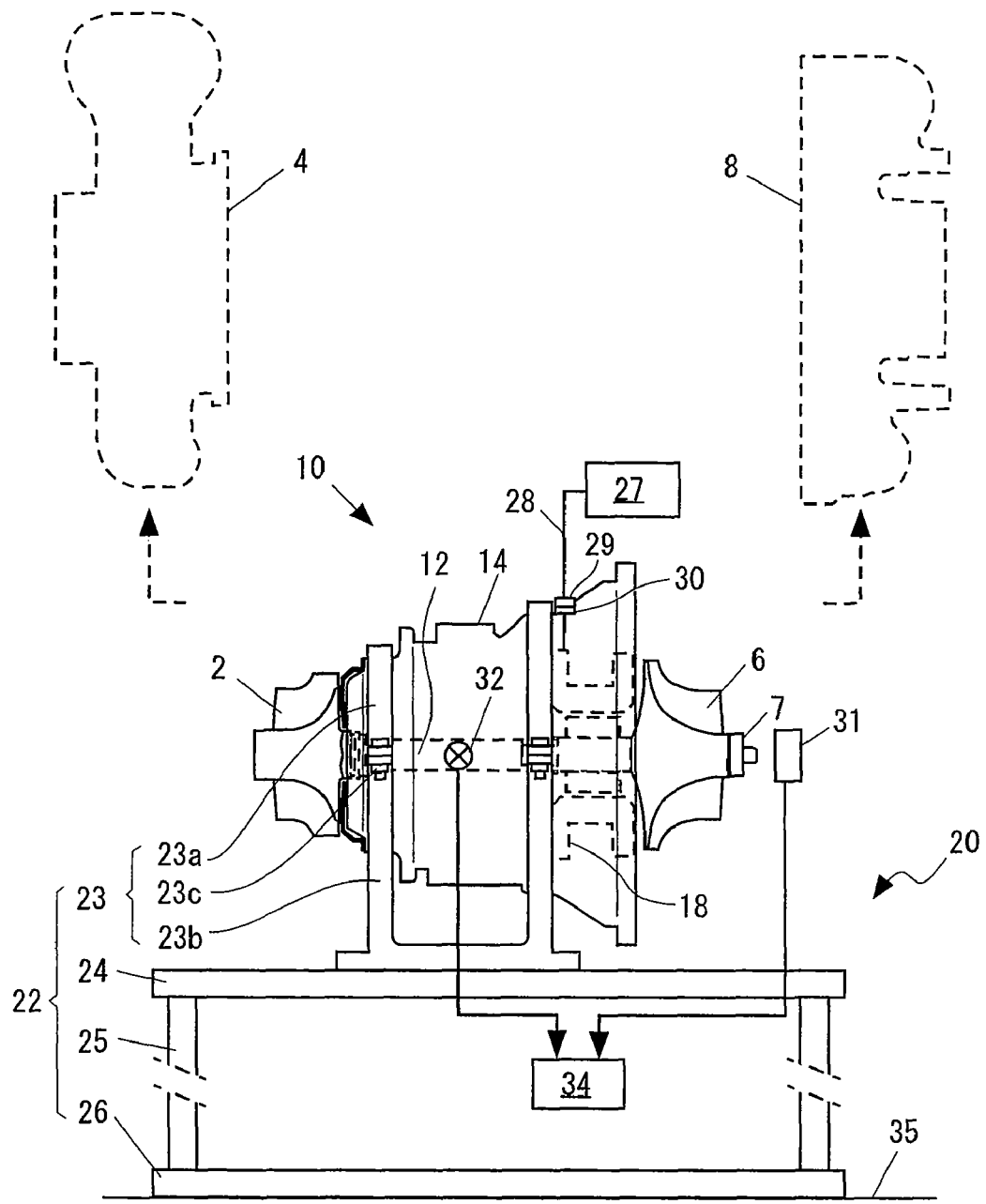
FIG. 2 is a view of a skeleton structure showing a first embodiment in accordance with the present invention.

FIG. 2 is a view showing a skeleton structure of a rotation balance testing apparatus 20 for executing a rotation balance correcting method of a motor-driven supercharger in accordance with a first embodiment of the present invention.

The rotation balance testing apparatus 20 corresponds to an apparatus for applying a test for correcting a rotation balance to a motor-driven supercharger 10, and is provided with a supercharger installation table 22, a dedicated motor driver 27 and data detecting device 31 and 32, as shown in FIG. 2.

Figure 4:
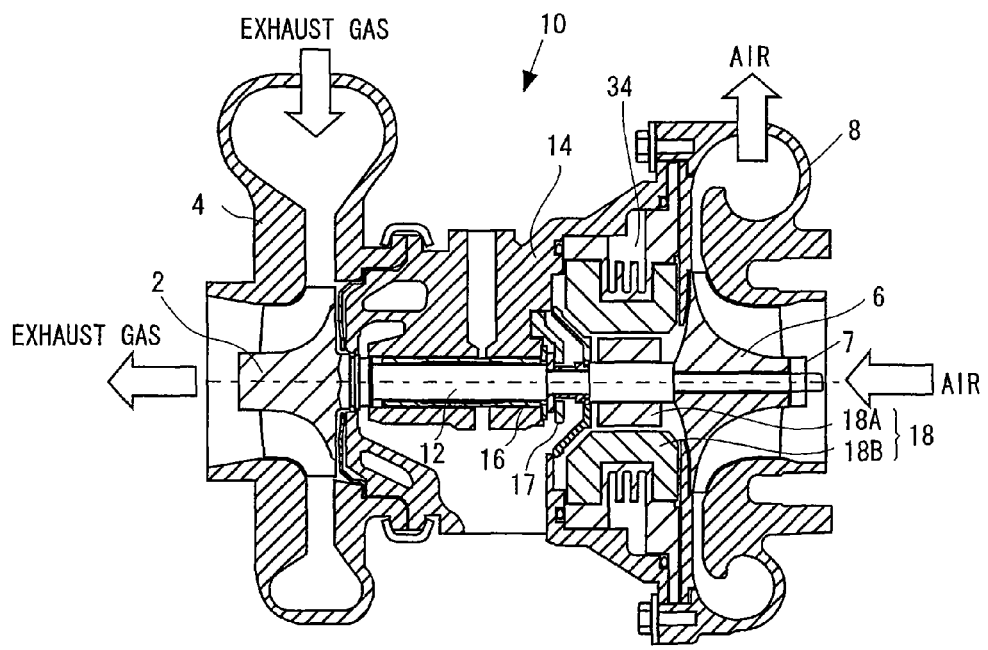
FIG. 4 is a view showing a structure of a general motor-driven supercharger.

The motor-driven supercharger 10 corresponding to an object to be corrected in the present embodiment is similar to the motor-driven supercharger 10 shown in FIG. 4, and has an electric motor 18 for rotationally driving a shaft 12 and assisting an acceleration of the shaft built-in.

Further, in order to execute the rotation balance test, the motor-driven supercharger 10 is installed and fixed to the rotation balance testing apparatus 20 in a state in which a turbine housing 4 and a compressor housing 8 are detached, and a turbine impeller 2 and a compressor impeller 6 are exposed to an outer portion. In this case, in the motor-driven supercharger 10 shown in FIG. 2, the same reference numerals are attached to common portions to those in FIG. 4.

In this case, the motor-driven supercharger 10 corresponding to the object to be corrected in the present embodiment is of a type that a bearing of the shaft 12 is arranged in a turbine side, and the electric motor 18 is arranged in a compressor side, however, the applied range of the present invention is not limited to this, but the present invention can be applied to the other types of motor-driven superchargers.

Accordingly, the present invention can be properly applied to the motor-driven supercharger of the type that the electric motor is arranged in the center portion and the bearings are arranged in both sides thereof, for example, disclosed in Japanese Unexamined Patent Publication No. 2003-293785.

In the present embodiment, the supercharger installation table 22 corresponds to a table for installing and fixing the center housing 14 of the motor-driven supercharger 10, and is provided with a mounting portion 23 to which the center housing 14 is attached, a top plate 24 to which the mounting portion 23 is fixed, a plurality of leg portions 25 supporting the top plate 24, and a bottom plate 26 supporting the leg portions 25 and installed on a floor surface 35.

The mounting portion 23 is constituted by an upper member 23a, a lower member 23b and a fastening part 23c (for example, a bolt), and is structured such as to hold the center housing 14 between the upper member 23a and the lower member 23b so as to firmly fix.

In this case, an aspect of the supercharger installation table 22 is not limited to the aspect shown in the present embodiment, but can employ various aspects within a range which can install and fix the center housing 14 of the motor-driven supercharger 10.

The dedicated motor driver 27 is constituted by an independent motor driver from an acceleration assisting motor driver for supplying an electric power to the electric motor 18 at a time of assisting the acceleration.

In the motor-driven supercharger 10 corresponding to a finished product (a final product), the electric motor 18 is driven by the motor driver for supplying the electric power to the electric motor 18 at a time of assisting the acceleration, the acceleration assisting motor driver is generally designed such as to supply an electric power capable of obtaining a necessary and sufficient output for assisting the acceleration to the end (for example, about 1 kW output).

However, even in a state of detaching the turbine housing 4 and the compressor housing 8 of the motor-driven supercharger 10, the output about 5 to 6 kW is necessary for rotationally driving the supercharger rotor to a high-speed rotation necessary for the rotation balance test. Accordingly, in the acceleration assisting motor driver, there is a case that it is hard to increase a rotating speed of the electric motor 18 to the high-speed rotation required for the rotation balance test.

Accordingly, the dedicated motor driver 27 supplies a greater electric power than the power supply of the acceleration assisting motor driver to the electric motor 18. The power supply is set in such a manner as to be capable of rotationally driving the supercharger rotor to the high-speed rotation necessary for the rotation balance test.

Further, the dedicated motor driver 27 is structured such as to be electrically connected to the electric motor 18 by a power cable 28. In the present embodiment, it is possible to connect by inserting a plug 29 provided in a leading end of the power cable 28 to a socket 30 provided in the center housing 14.

In this case, the plug 29 or the socket 30 may be provided in an end portion of the dedicated motor driver 27 side of the power cable 28.

The data detecting device corresponds to a means for detecting the data necessary for correcting the rotation balance of the motor-driven supercharger 10, and has a rotation detector 31 and an acceleration pickup 32 in the present embodiment.

The rotation detector 31 is arranged near the compressor impeller 6 in the present embodiment, and detects an angle of rotation of the supercharger rotor at a time when the supercharger rotor rotates at a high speed. In this case, the rotation detector 31 may be arranged near the turbine impeller 2 in place of being arranged near the compressor impeller 6.

The acceleration pickup 32 is attached to the center housing 14, for example, by a magnet, and detects an acceleration (a vibration) of the supercharger rotor at a time when the supercharger rotor rotates at a high speed.

Further, the rotation balance testing apparatus 20 is provided with a computing element 34 judging on the basis of the detected data from the rotation detector 31 and the acceleration pickup 32 what angle and how the acceleration (the vibration) is generated, and executing a computation necessary for correcting the balance. A result of computation by the computing element 34 is output by a display or a printer (not shown).

Next, a description will be given of the rotation balance correcting method of the motor-driven supercharger using the rotation balance testing apparatus 20.

First, the motor-driven supercharger 10 is installed and fixed to the supercharger installation table 22 mentioned above, in the state of detaching the turbine housing 4 and the compressor housing 8.

Next, the acceleration pickup 32 is attached to the center housing 14 of the motor-driven supercharger 10, and the rotation detector 31 is arranged near the compressor impeller 6 (or the turbine impeller 2).

Next, the plug 29 of the power cable 28 is inserted to the socket 30, thereby setting a state in which the electric power can be supplied to the electric motor 18 form the dedicated motor driver 27.

Next, the electric motor 18 is driven by supplying the electric power from the dedicated motor driver 27, so as to rotate the supercharger rotor (the turbine impeller 2, the compressor impeller 6 and the shaft 12) of the motor-driven supercharger 10 at a high speed.

If the supercharger rotor reaches a predetermined rotating speed for executing a measurement of an unbalance amount, a vibration and a phase are detected by the acceleration pickup 32, and an angle of rotation of the supercharger rotor is detected by the rotation detector 31. Further, a computation necessary for correcting the balance is executed by the computing element on the basis of the detected data, and a result of computation is output by the display or the printer (not shown).

Further, the correction of the rotation balance is executed on the basis of the result of computation. At this time, the rotation balance correction is executed by deleting a part of the turbine impeller 2, the compressor impeller 6 or the nut 7.

Next, a description will be given of an operation and an effect of the method and the apparatus in accordance with the present embodiment.

In accordance with the method and the apparatus on the basis of the present embodiment, since the rotation balance is corrected by using the electric motor 18 built in the motor-driven supercharger 10, rotationally driving the supercharger rotor constituted by the turbine impeller 2, the compressor impeller 6 and the shaft 12, and detecting the necessary data for correcting the rotation balance of the motor-driven supercharger 10, it is not necessary to supply the compressed air for rotating the supercharger rotor at a high speed to the turbine impeller 2.

Accordingly, the compressed air source is not necessary, and it is possible to make the rotation balance testing apparatus 20 simple and compact.

Further, since it is possible to correct the electromagnetic unbalance by measuring the unbalance amount at a time of driving the electric motor 18, and it is possible to reduce the noise generated by the vibration of the rotating body.

Further, in the acceleration assisting motor driver, there is a case that it is hard to increase the rotating speed of the electric motor to the high-speed rotation required for the rotation balance test, however, in the present invention, since the electric motor 18 is driven by using the dedicated motor driver 27 supplying the larger electric power than the power supply of the acceleration assisting motor driver, it is possible to increase the rotating speed of the supercharger rotor to the high-speed rotation required for the rotation balance test.

Further, in accordance with the present invention, since the supercharger rotor is rotationally driven by the electric motor 18, it is not necessary to supply the compressed air to the turbine impeller 2 at a time of executing the rotation balance test. Accordingly, it is possible to execute the rotation balance test in a state of detaching not only the compressor housing 8, but also the turbine housing 4.

Accordingly, the pressure balance in the inner portion of the supercharger does not come down as is different from the conventional method, and the excessive thrust force or counterthrust force is not applied to the thrust bearing.

Further, in the conventional method, it is necessary to detach the turbine housing 14 and the piping connected thereto in the case that it is necessary to adjust the balance in the turbine impeller 2 side, however, in accordance with the method of the present invention, since such the work is not necessary, it is possible to rapidly execute the balance correcting work and it is possible to widely shorten the correcting work time.

Second Embodiment

A description will be given below of a second embodiment in accordance with the present invention.

Figure 3:
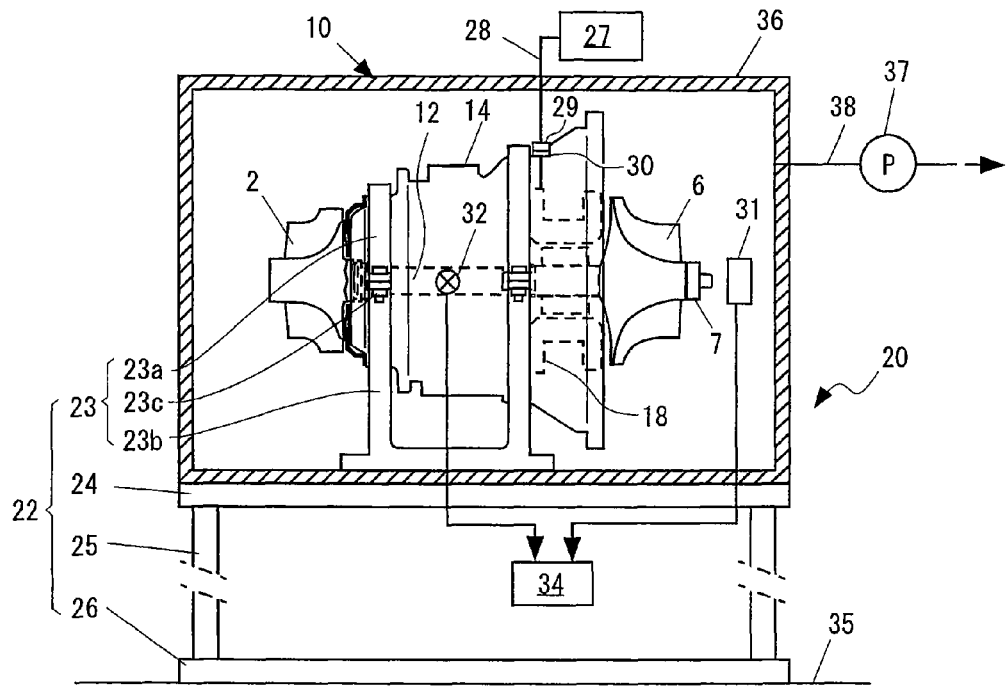
FIG. 3 is a view of a skeleton structure showing a second embodiment in accordance with the present invention.

FIG. 3 is a view showing a skeleton structure of a rotation balance testing apparatus 20 for executing a rotation balance correcting method of a motor-driven supercharger in accordance with the second embodiment of the present invention.

As shown in FIG. 3, the rotation balance testing apparatus 20 in accordance with the present embodiment is provided further with a depressurizing chamber 36 in the apparatus of the first embodiment.

The depressurizing chamber 36 can accommodate the motor-driven supercharger 10, and is structured such that an inner portion can be decompressed. An exhaust line 38 and a decompressing pump 37 (a vacuum pump) are connected to the decompressing chamber 36, whereby the inner portion of the decompressing chamber 36 is set to a predetermined decompressed state.

The structure of the other portions of the rotation balance testing apparatus 20 in accordance with the present embodiment is the same as that of the first embodiment mentioned above.

In the rotation balance correcting method of the motor-driven supercharger using the rotation balance testing apparatus 20 in accordance with the present embodiment, the rotation balance test is executed by installing the motor-driven supercharger 10 within the depressurizing chamber 36 and rotating the supercharger rotor. The other steps are the same as those of the first embodiment mentioned above.

Since the supercharger rotor is rotationally driven by installing the motor-driven supercharger 10 within the decompressing chamber 36, it is possible to reduce an air resistance applied to the turbine impeller 2 and the compressor impeller 6 at a time when they are rotated.

Accordingly, it is possible to securely increase the rotating speed of the supercharger rotor to the high-speed rotation required for the rotation balance test.

In this case, the higher a degree of decompression (a vacuum degree) within the depressurizing chamber 36 is, the lower the air resistance applied to the turbine impeller 2 and the compressor impeller 6 is preferably. However, an air resistance reducing effect can be obtained at least by setting it lower than the atmospheric pressure (0.1 MPa).

As is apparent from the description of each of the embodiments mentioned above, in accordance with the present invention, there can be obtained an excellent effect that it is possible to make the rotation balance testing apparatus simple and compact, and it is possible to easily execute the balance correction in the turbine impeller side without the excessive counterthrust force applied to the thrust bearing.

In this case, it goes without saying that the present invention is not limited to the embodiment mentioned above, but can be variously modified within the scope of the present invention.

What is claimed is:

1. A rotation balance correcting method of a motor-driven supercharger, wherein the motor-driven supercharger is structured so as to accelerate and assist a rotation of a supercharger rotor in which a turbine impeller and a compressor impeller are coupled to both ends of a shaft of the motor-driven supercharger, and are integrally rotated by a built-in electric motor, wherein the method comprises the steps of:
  (a) rotationally driving the supercharger by the electric motor, wherein the electric motor is driven by using a dedicated motor driver that is different from an acceleration assisting motor driver supplying an electric power to the electric motor at a time of assisting the acceleration and supplies a larger electric power than a power supply of the acceleration assisting motor driver to the electric motor;
  (b) detecting data necessary for correcting the rotation balance of the motor-driven supercharger; and
  (c) correcting the rotation balance.

2. The rotation balance correcting method of a motor-driven supercharger as claimed in claim 1, wherein the supercharger rotor is rotationally driven by the electric motor in a state of detaching a turbine housing and a compressor housing.

3. The rotation balance correcting method of a motor-driven supercharger as claimed in claim 2, wherein the motor-driven supercharger is installed within a depressurizing chamber in which an inner portion is depressurized, and the supercharger rotor is rotationally driven.

4. A rotation balance testing apparatus of a motor-driven supercharger, wherein the rotation balance testing apparatus applies a test for correcting a rotation balance to the motor-driven supercharger structured so as to accelerate and assist a rotation of a supercharger rotor in which a turbine impeller and a compressor impeller are coupled to both ends of a shaft of the motor-driven supercharger, and are integrally rotated by a built-in electric motor, wherein the rotation balance testing apparatus comprises:
  (a) a supercharger installation table capable of installing and fixing a center housing rotatably supporting the shaft of the motor-driven supercharger;
  (b) a dedicated motor driver that is different from an acceleration assisting motor driver supplying an electric power to the electric motor at a time of assisting an acceleration and supplies a larger electric power than an electric power of the acceleration assisting motor driver to the electric motor; and
  (c) a data detecting device for detecting data necessary for correcting the rotation balance of the motor-driven supercharger.

5. The rotation balance testing apparatus of a motor-driven supercharger as claimed in claim 4, wherein the rotation balance testing apparatus is further provided with a depressurizing chamber capable of accommodating the motor-driven supercharger and capable of decompressing an inner portion.

\* \* \* \* \*